May 17, 1960 HORST-GÜNTHER ROTT ET AL 2,936,930
CIGARETTE DISPENSER WITH ELECTRIC LIGHTING DEVICE
Filed Jan. 27, 1958 10 Sheets-Sheet 1

INVENTORS:

May 17, 1960  HORST-GÜNTHER ROTT ET AL  2,936,930
CIGARETTE DISPENSER WITH ELECTRIC LIGHTING DEVICE
Filed Jan. 27, 1958  10 Sheets-Sheet 2

INVENTORS:

May 17, 1960  HORST-GÜNTHER ROTT ET AL  2,936,930
CIGARETTE DISPENSER WITH ELECTRIC LIGHTING DEVICE
Filed Jan. 27, 1958  10 Sheets-Sheet 3

INVENTORS:

May 17, 1960   HORST-GÜNTHER ROTT ET AL   2,936,930
CIGARETTE DISPENSER WITH ELECTRIC LIGHTING DEVICE
Filed Jan. 27, 1958   10 Sheets-Sheet 4

Fig.5

INVENTORS

Fig.6

May 17, 1960 HORST-GÜNTHER ROTT ET AL 2,936,930
CIGARETTE DISPENSER WITH ELECTRIC LIGHTING DEVICE
Filed Jan. 27, 1958 10 Sheets-Sheet 6

INVENTORS:

May 17, 1960  HORST-GÜNTHER ROTT ET AL  2,936,930
CIGARETTE DISPENSER WITH ELECTRIC LIGHTING DEVICE
Filed Jan. 27, 1958                                    10 Sheets-Sheet 7

INVENTORS:

United States Patent Office 2,936,930
Patented May 17, 1960

2,936,930
CIGARETTE DISPENSER WITH ELECTRIC LIGHTING DEVICE

Horst-Günther Rott, Frankfurt am Main, Carl F. Gruber, Frankfurt am Griesheim, Walter Beha, Frankfurt am Main, and Rudolf Ankert, Viernheim, Germany, assignors to Schoeller & Co., Elektrotechnische Fabrik, Frankfurt, Germany, a corporation of Germany Application January 27, 1958, Serial No. 711,490

Claims priority, application Germany February 1, 1957

17 Claims. (Cl. 221—15)

The present invention relates to automatic cigarette dispensers with a magazine for cigarettes and an electric lighter, wherein a cigarette is first lighted and then partly ejected so that its tip protrudes from the dispenser. Such dispensers are actuated by a pusher rod which either winds up the spring of a clock mechanism which serves as a power source for the entire device, or which controls an electric motor to drive all movable parts.

The known cigarette dispensers of this type have different drawbacks. The operation of all movable parts from a single power source requires a plurality of switching and control means whereby the cooperation of the individual components causes easily failure of proper operation. The cigarettes, which are disposed within the magazine container, may readily edge against each other so that the proper feeding of one cigarette from the magazine into the conveying devices may be prevented. By hasty or prematurely repeated operation of the pusher rod a proper functioning may be disturbed, particularly as long as the lighted cigarette has not yet been removed from the outlet opening of the dispenser.

It is, therefore, one object of the present invention to eliminate these known disadvantages.

It is another object of the present invention to improve the dispensers by elimination of vapors evolving from the cigarette at the electric lighter.

It is still another object of the present invention to provide a cigarette dispenser of the above-mentioned type with a plurality of mutually separate power storing devices which serve only the purpose to return the movable parts to their original position, whereas the forward stroke of these parts as well as the charging of the power storers is effected by means of a manually actuable pusher rod during the forward displacement of that rod.

It is also another object of the present invention to provide the magazine chamber of the dispenser with two bottom plates which, during the dispensing operation, are movable in mutually opposite directions.

It is yet a still further object of the present invention to provide the dispenser with a locking device which prevents a prematurely repeated operation of the pusher rod prior to removal of the lighted cigarette.

With these and other objects in view which will become apparent in the following detailed description, the present invention will be clearly understood in connection with the accompanying drawings, in which.

Figure 14:
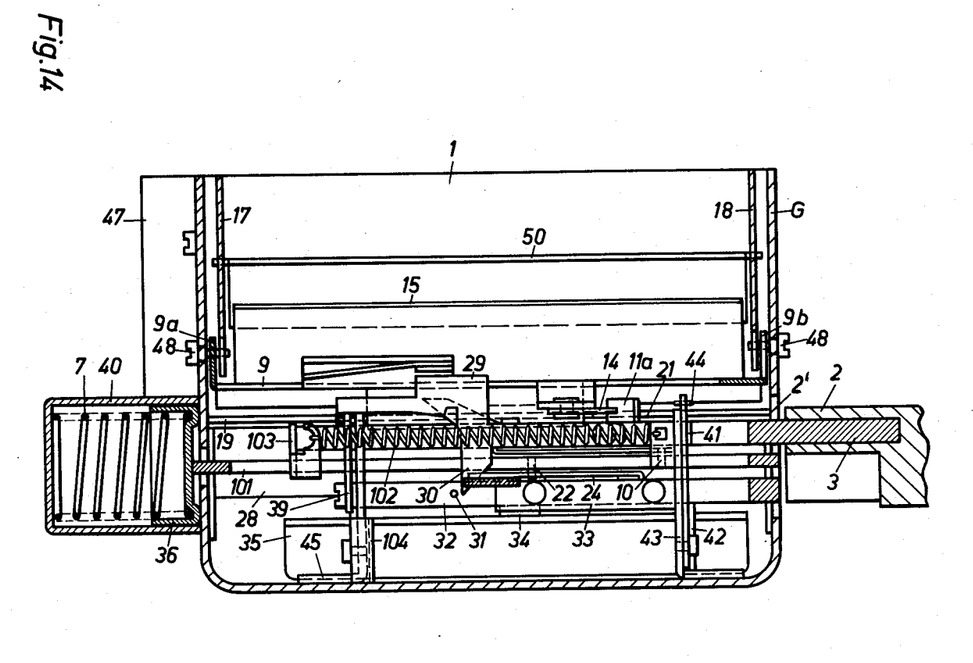
Fig. 14 is a part sectional view of the dispenser shown in Fig. 13 and corresponds to that shown in Fig. 5.

Referring now to the drawings, the dispenser illustrated in Figs. 1 to 11 has a magazine chamber 1 and is provided with a push button 2 (Fig. 5) which is disposed normally outside of the housing G, but may be pushed into the housing G by manual operation through an opening 2' of the housing G (Fig. 14). The push button 2 is mounted on a pusher rod 3 and has a lateral groove 2a into which the end of a control rod 32 may enter during a predetermined phase of the operation of the dispenser.

Figure 1:
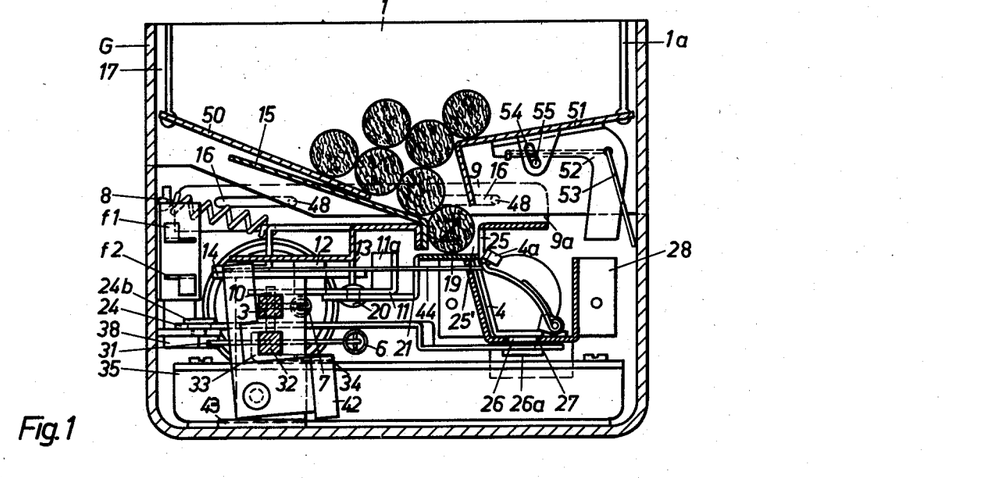
Figure 1 is a front view of the frontal portion of a cigarette dispenser partly in section and the front wall being removed.
Figure 6:
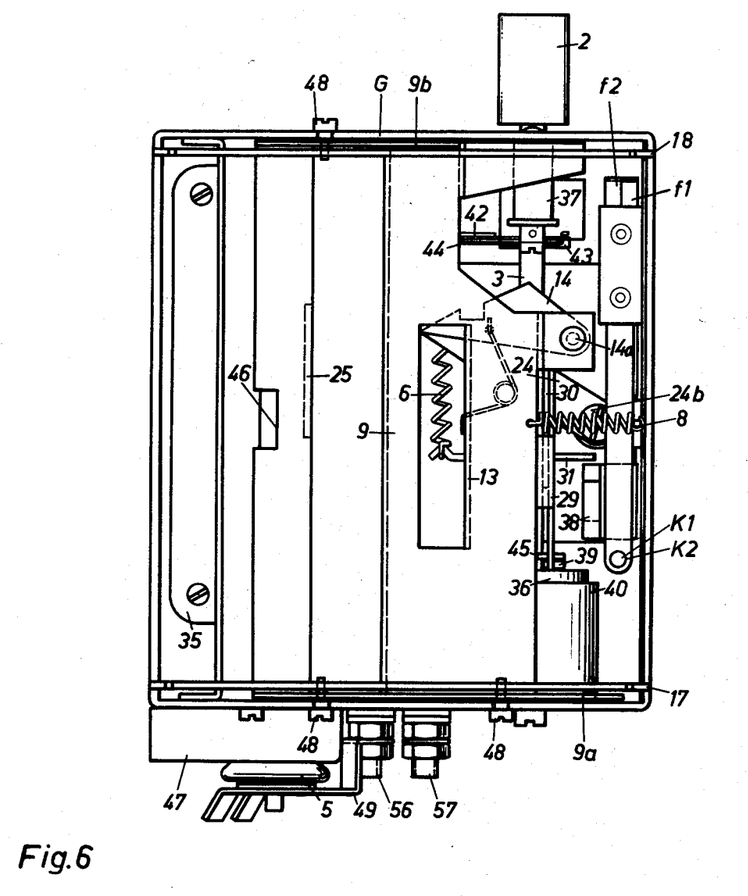
Fig. 6 is a top plan view of the dispenser shown in Fig. 5, some parts being removed.

The pusher rod 3 carries a lateral pin 10 (Fig. 4) which engages a recess in an angular lever 11 and turns this lever clockwise about a pivot pin 20 when the rod 3 is pushed by operation of the button 2. The angular lever 11 has a short arm with a lateral lug 11a, and a long arm with a rounded nose 12. The nose 12 is adapted to engage the face 13 of a slider 9 (Figs. 1, 6). The slider 9 then moves from the left toward the right horizontally (as seen in Fig. 1) beneath the hinged bottom plates 50 and 51 of the magazine chamber 1. The slider 9 has bent-off side portions and is equipped with slots 16 (Figs. 1, 3) which receive guide bolts 48 (Figs. 2, 6) and which also connect the side walls 17, 18 of the magazine chamber 1 with the housing G. A downwardly extending lug 25 of the slider 9 (Fig. 1) forms a trough 25' together with the likewise downwardly extending edge portion of an inclined closure plate 15. The bottom of the trough 25' is formed by a fixed sheet member 19, the pivot pin 20 of the angular lever 11 being fastened to the downwardly extending portion 21 of the sheet member 19. In the trough 25' is disposed the lowermost cigarette Z of the cigarette supply in the magazine chamber 1 before the dispenser is put in operation.

Figure 3:
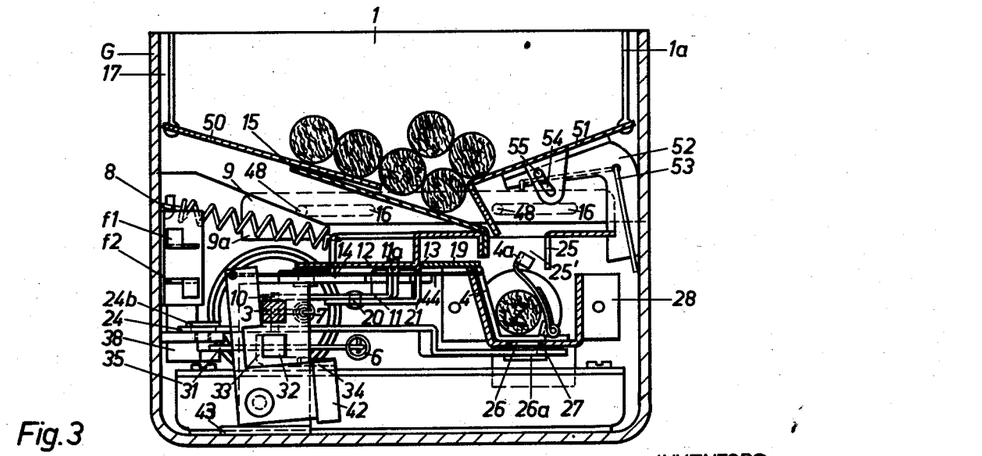
Fig. 3 is a front view similar to that of Fig. 1, but showing the first stage of operation, namely a cigarette being just in position to be lighted.

The bottom plates 50 and 51 of the magazine chamber 1 are movable up and down in mutually opposite directions, as will be more fully described below. This reciprocating motion of the bottom plates serves the purpose to prevent the formation of mutual bracing or edging of the cigarettes in the magazine chamber 1 thus securing a reliable discharge of only one cigarette at a time. When the rod 3 is pushed, the slider 9 moves toward the right (Fig. 6) until its portion 21 abuts against a pawl 14 pivoted at 14a. The displacement of the slider 9 entrains also the closure sheet 15 (Fig. 3) which lifts the bottom plate 50 of the magazine chamber 1 and closes the gap between the two bottom plates 50 and 51 while shoving the cigarette Z on sheet 19 toward the right (Fig. 3). At the same time, the slider 9 pushes, within a recess 46 (Fig. 6), against an angular member 52 pivotally connected with the bottom plate 51. This turns the angular member 52 about its pivot in opposition to the force of a spring 53 (Fig. 3) so that the bottom plate 51 is forced downwardly. The movement of the plate 51 is limited in both directions by means of a guiding slot 54 and a guide pin 55 near the front edge of bottom plate 51.

The upwardly rotating bottom plate 50 and the downwardly rotating bottom plate 51 cooperate to move the cigarettes in the magazine chamber 1 against each other to preserve the necessary mobility of the individual cigarettes so that edging and clogging of the cigarette supply is prevented.

The cigarette Z displaced from sheet member 19 transversely to the cigarette axis, drops into a holding claw 4 (Figs. 1, 3). At that moment, a pivoted and spring-biased member 4a of the claw is held open by the lug portion 25 of the slider 9 pushing toward the right. The claw 4 has a bottom piece 26 guided in a longitudinal slot 27 of the trough 28 which, aside from forming a guide for the claw 4, also serves to prevent edging of the cigarette when dropping into the claw.

Connected with the claw bottom piece 26 is a head 26a which glides in a guiding slot 24a of a lever 24 (Fig. 2) pivoted at 24b. Lever 24 is rotatable from the full-line position to the broken-line position and, during such rotation, moves the claw 4 in the longitudinal slot 27 from the front to the rear of the trough structure 28. The lever 24 is driven by a cross pin 22 of the pusher rod 3 which engages an elongated opening 23 of lever 24.

At the moment, when the cigarette Z drops into the holder claw 4, the lever 24 has passed forward through approximately one-half of its way between the limit positions. At the same moment, the spring-biased member 4a of the claw slides off the lug portion 25 of the slider 9 and thus clamps the cigarette in the claw so that the cigarette, during the further forward travel of lever 24 and claw 4, is displaced longitudinally toward the lighter.

Figure 4:
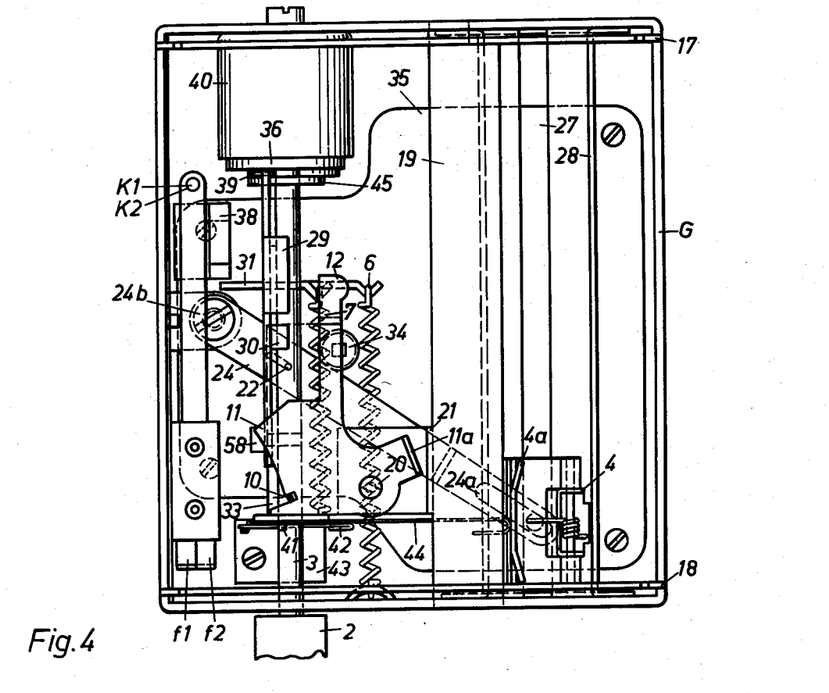
Fig. 4 is a top plan view of the center portion of the dispenser at the height of the pusher rod.

All these constrainedly controlled motions take place during the forward run of the pusher rod 3. At the same time, the pusher rod 3 causes a charging of the power storing devices consisting of the pull springs 6, 7 and 8 (Figs. 1, 2, 4, 6). These springs, thus tensioned, individually actuate the switching operation for the electric lighting device, the return motion of the pusher rod, and the return of the control slider 9. For securing uniform motion of the pusher rod 3 during forward and return run, the piston 36 of an air brake cylinder 40 is mounted on the inward end of the pusher rod (Fig. 4).

Figure 5:
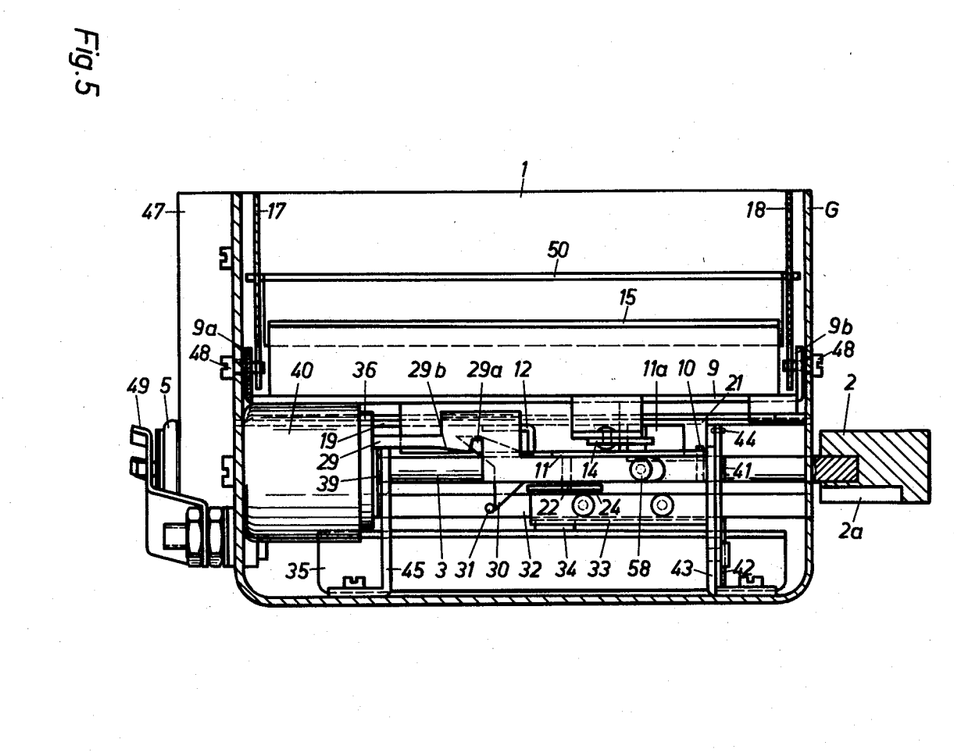
Fig. 5 is an end view partly in section.
Figure 7:
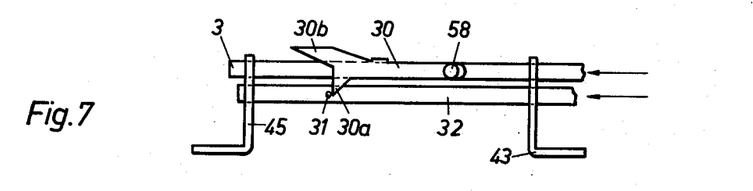
Figs. 7 and 8 are fragmentary views of the dispenser disclosing particularly the latch of the pusher rod.
Figure 8:
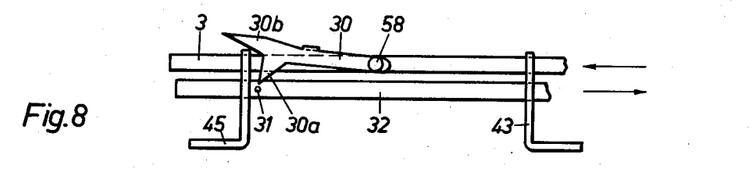

Pivotally linked to the pusher rod 3 are two latch pawls 29, 30 on a common pivot pin 58 (Figs. 5, 7, 8). The pawl 29 has a recess 29a (Fig. 5) which catches onto a fixed angular bearing piece 45 and then latches the pusher rod 3 in its rear limit position. The recess 29a is located at the end of a slanting edge 29b whose purpose will be explained further below.

The pawl 30 (Figs. 7, 8) has two pointed tips 30a and 30b (Fig. 7). During inward displacement of the pusher rod 3 the tip 30a abuts against a pin 31 of a control rod 32 which extends and is displaceable in parallel relation to the pusher rod 3. Near the end of the forward (inward) displacement of the pusher rod 3, the tip 30b of the pawl 30 glides onto the upper edge of the rear bearing angle 45 (Fig. 8). This causes lifting of the pawl 30 so that the pin 31 is released and the control rod 32 commences its return motion under the pull of the spring 6. This occurs immediately after latching of the pusher rod 3 in the inward limit position.

Figure 9A:
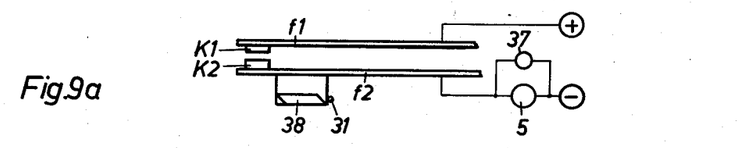
Figs. 9a, b, c illustrate the electric control devices for the cigarette lighter in three different positions, respectively.
Figure 9B:
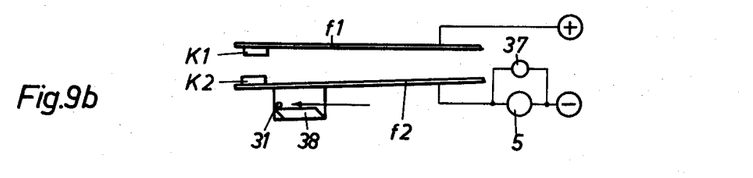
Figure 9C:
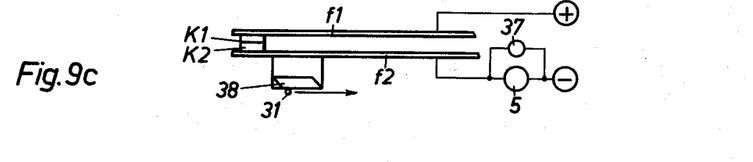
Figure 10:
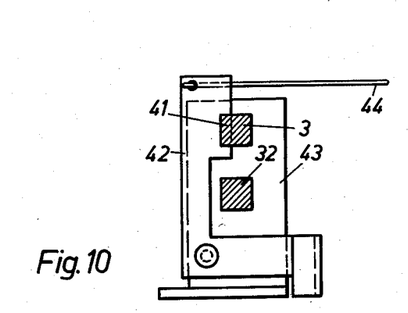
Fig. 10 illustrates a locking device preventing the premature operation of the pusher rod in the dispenser.
Figure 11:
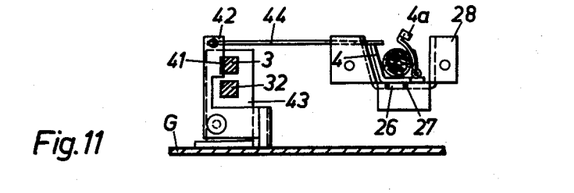
Fig. 11 shows the locking device of Fig. 10 coacting with a claw for holding the cigarette.

Figs. 9a, 9b, and 9c illustrate how the pin 31 (Figs. 5, 7, 8) controls a spring-contact switch in the electric circuit for the heater spiral 5 and a parallel connected signal lamp 37 mounted on the front wall of the cigarette dispenser. The switch (Fig. 9a) comprises two contact springs $f_1$ and $f_2$ with respective contacts $k_1$ and $k_2$. Connected with the contact spring $f_2$ is a rhomboid-shaped cam piece 38. The pin 31, when traveling along the last portion of its forward run and prior to its disengagement from the pawl 30, runs onto the cam piece 38 and then slightly increases the mutual spacing between the contacts $k_1$ and $k_2$ (Fig. 9b), as compared with the normal position (Fig. 9a). At the releasing moment, the pin 31 has just passed beyond the cam piece 38 so that the contacts $k_1$ and $k_2$ again have the same mutual spacing as in Fig. 9a. During its return motion, the pin 31, which now engages the cam piece 38 from below, lifts the cam piece and thus temporarily closes the contacts $k_1$ and $k_2$ (Fig. 9c), until the pin 31 runs off the right-hand end of the cam piece 38.

The heater spiral 5 (Figs. 5, 6, 12), designed and shaped in accordance with well-known cigar and cigarette lighters, is forced into a lateral opening of a chimney 47 by means of a strong, slotted contact spring 49 (Figs. 5, 6). The chimney 47 is placed upon the rear wall of the dispenser housing G so that the heater spiral 5 is located coaxially opposite the inward end of the trough 28. By virtue of this design the heater spiral can readily and conveniently be inspected and replaced. Denoted by 56 and 57 are terminals for connecting electric supply leads to the lighter. The chimney 47 passes the smoke or vapors, resulting from the lighting of the cigarette, upwardly away from the interior of the dispenser.

The cigarette Z has, during forward run of the pusher rod 3, its end placed against the heater spiral 5 due to the action of the lever 24 and the claw 4 driven thereby. Hence, the cigarette Z is lighted as soon as the electric heating current is switched on. Due to the air draft in the chimney 47, a blower, needed in known cigarette dispensers of similar type, is not necessary.

The control rod 32, too, is provided with a braking device for securing a slow, uniform and controllable return travel. For this purpose a rack 33 is attached to the control rod 32 (Fig. 5) and meshes with a pinion 34 (Fig. 2) for driving an eddy-current brake 35 (Fig. 5). The mechanism is provided with a free-wheeling clutch (not shown) so that the eddy-current brake 35 operates only during return travel of the control rod. Since such eddy-current brakes are generally known and their structural details are not part of the invention proper, the brake is not further described herein. In lieu of an eddy-current brake, other known adjustable braking devices such as liquid brakes, centrifugal speed regulators and the like may be used in combination with an overrun or free-wheeling clutch.

Figure 2:
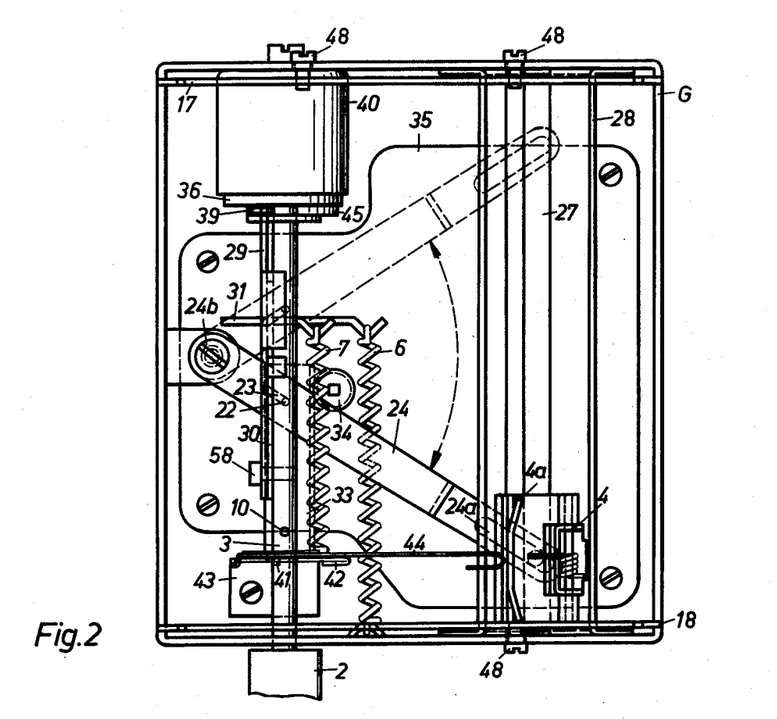
Figure 2 is a top plan view of the same dispenser, the cover plate of the housing as well as the bottom plates of the magazine chamber being removed.

Located at the inward end of the control rod 32 is a releasing plate 39 (Fig. 5). After the lighting device is switched off by the pin 31 which slides off the cam piece 38 during the return movement of the control rod 32, the releasing plate 39 is engaged by the inclined edge 29b of pawl 29 so that the latter is lifted. As a result, the pusher rod 3 is unlatched from the rear bearing angle 45 and commences its return run under the action of the pull spring 7. At the starting moment of this run, the pin 22 in the elongated hole 23 of the lever 24 acts to displace the holder claw 4 together with the lighted cigarette Z in the trough 28 in the outward direction until the lever 24 again reaches the full-line starting position (Fig. 2). In this position, the tip of the cigarette Z protrudes out of the front wall of the dispenser housing, so that it can readily be removed. At the same time, the guide pin 10 returns the angular lever 11 so that the lug 11a of the short lever arm releases the latch 14 of the slider 9, and the slider 9 is returned to its starting position by the action of the pull spring 8. The braking piston 36 disposed at the end of the pusher rod 3, which coacts with the brake cylinder 40, provides for a uniform and slow return movement of the pusher rod back to its starting position.

The cigarette dispenser, according to the present invention, is further provided with a latching device which prevents repeated operation of the pusher rod 3 before the lighted cigarette is removed. For this purpose, a pawl 42 is pivotally mounted on the front bearing angle 43 of the pusher rod 3. The pawl 42 is latchingly engageable with a recess 41 of the pusher rod 3 in order to prevent renewed operation of the rod. The pawl 42 is loosely connected with a rod 44 disposed and guided in a groove 28a of trough 28. When the lighted cigarette is removed from the dispenser, the resilient claw member 4a closes and presses against the rod 44, thus shoving the pawl 42 out of the groove 41 in the pusher rod 3. As a result, the latching of the pusher rod 3 in its outward, inactive position is eliminated, as soon as the burning cigarette is taken from the dispenser, so that thereafter the push button 2 can again be depressed for lighting and dispensing another cigarette.

While Figs. 5 and 6 show the chimney 47 as terminating upwardly at the top of the dispenser housing, it is preferable, according to another feature of the present invention, to extend the chimney to the front side of the dispenser housing. This is particularly of advantage when using the cigarette dispenser in automotive vehicles where the dispenser is inserted into the instrument panel. In this case the inlet opening for the air passing into the chimney is located in the interior of the vehicle where, during travel of the vehicle, there may be pressure and flow conditions of the air different from those behind the instrument panel so that the draft within the chimney may be insufficient if the chimney top is also located behind the panel. This may cause smoke, evolving at the heater spiral 5 during lighting of the cigarette, to pass into the interior of the dispenser where detrimental deposition of residue may occur. However, if the chimney is extended up to the front of the instrument panel, a considerably improved draft in the chimney is obtained. This effect can be further improved by additionally heating the smoke and burning the evolving carbon oxide at an additional electrically operated glowing surface.

Figure 12:
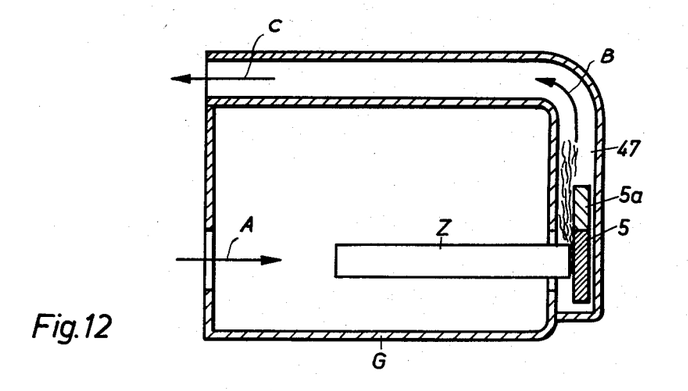
Fig. 12 is a vertical section through the housing of the dispenser and shows a modification of the chimney portion in which the electric cigarette lighter is located.
Figure 13:
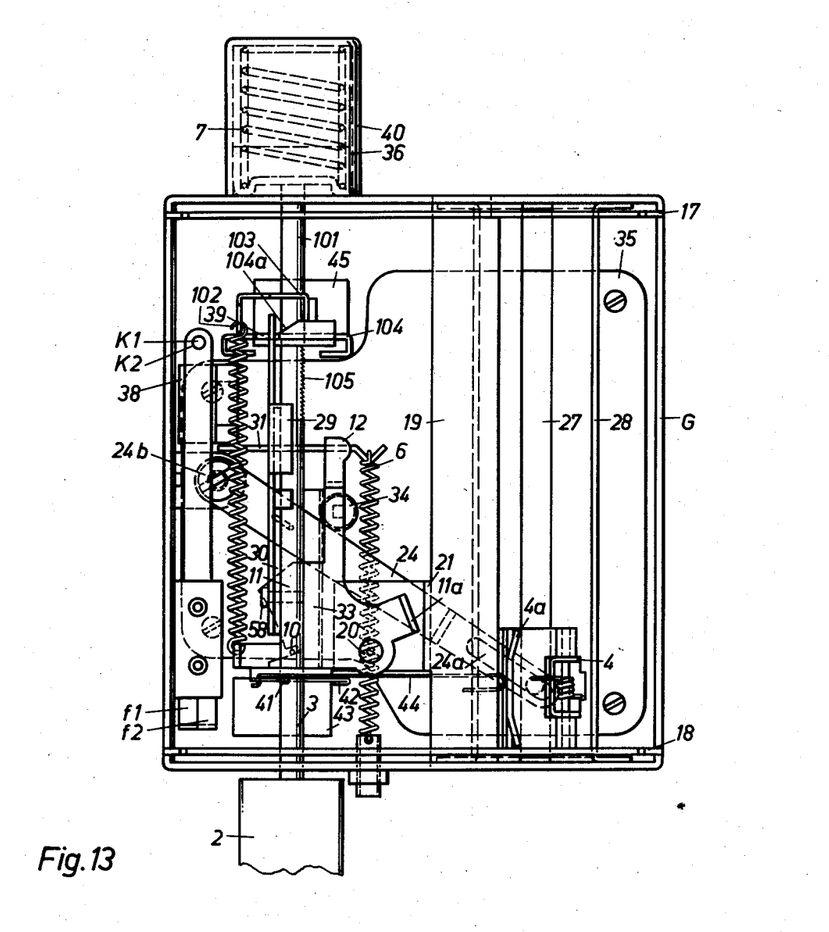
Fig. 13 is a part sectional front view of another embodiment of a cigarette dispenser according to the present invention, similar to that shown in Fig. 4.

The just-mentioned modification is illustrated in Fig. 13 and, in all other respects, may correspond to the design of the dispenser described above with reference to Figs. 1 to 11, or to the dispenser described below with reference to Figs. 13 to 15. In the device of Fig. 13, the air enters from the push-button side of the dispenser housing G through the dispenser outlet opening in the direction of the arrow A (Fig. 12). Passing around the cigarette Z to be lighted, the air then enters through an opening of the housing G into the chimney 47. The chimney 47 extends around the housing G and has its outlet disposed at the front side of the dispenser so that the smoke passes along the path denoted by arrows B and C. On this path, the smoke passes along a heater 5a which increases the smoke temperature and also burns the carbon oxide contained in the smoke. The resistance heater 5a may be combined with the heating spiral 5, by arranging the heating wire of the heater 5a in elongated turns or by winding the heating wire upon a U-shaped carrier in a manner known as such. It will be understood that the heating resistor 5a is switched on and off simultaneously with the lighter proper, in the manner described above with reference to Figs. 9a, 9b and 9c.

Although a dispenser as described above, with reference to Figs. 1 through 12, eliminates most of the sources of trouble encountered with known dispensers of this general type, the present invention also aims at further improving the dispenser to make it entirely foolproof. A dispenser of the design described above, may permit a certain abuse by a person operating the push button and pusher rod by impact, or by neglecting to push the button down to the point where the pusher rod becomes latched. During impactwise operation, the cigarette dropping from the magazine into the holder claw may not have sufficient time to occupy the correct position but may remain in an intermediate position and cause edging of the conveying elements. If the push button is not fully depressed, the cigarette located in the claw is not moved up to the lighting device and hence is not lighted, so that when the push button is again depressed, a second cigarette may drop into the claw and thus likewise cause edging or clamping in the mechanism.

In order to eliminate the first-mentioned possibilty of trouble, the effect and control of the forward run of the movable parts of the conveying devices is brought about by a separate auxiliary control rod for the forward run which is kept in constrained connection with the pusher rod through additional, pretensioned power-storing means. As a result, the forward movements of the conveying parts become independent of the velocity at which the pusher rod is pushed into the dispenser.

The above-mentioned second source of trouble, namely an incomplete pushing of the pusher rod, is prevented by providing the dispenser with a further latching device which prevents the pusher rod from returning to the starting position when the rod is incompletely moved toward the lighter spiral. As a result, the conveying devices can commence to operate only after the pusher rod has been latched to its rear bearing angle and hence is secured in the proper limit position.

Trouble may also result if the cigarettes are not filled into the magazine chamber in such a manner that all cigarettes are parallel. To prevent this, a grating with parallel slots may be placed into the magazine opening through which the cigarettes are placed into the magazine chamber.

Figure 15:
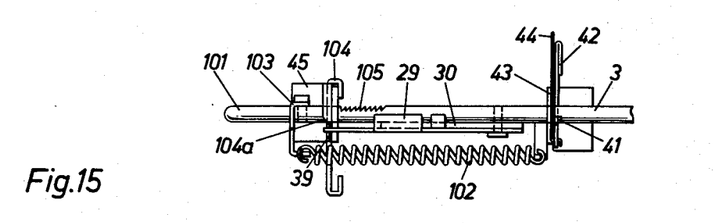
Fig. 15 is a fragmentary top view of the dispenser shown in Fig. 14.
Figure 16:
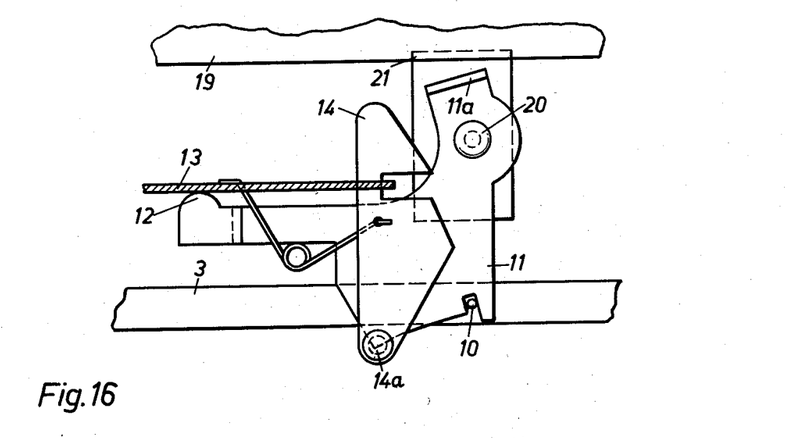
Fig. 16 is a fragmentary view of the dispenser disclosing an annular lever with the pushing rod.
Figure 16A:
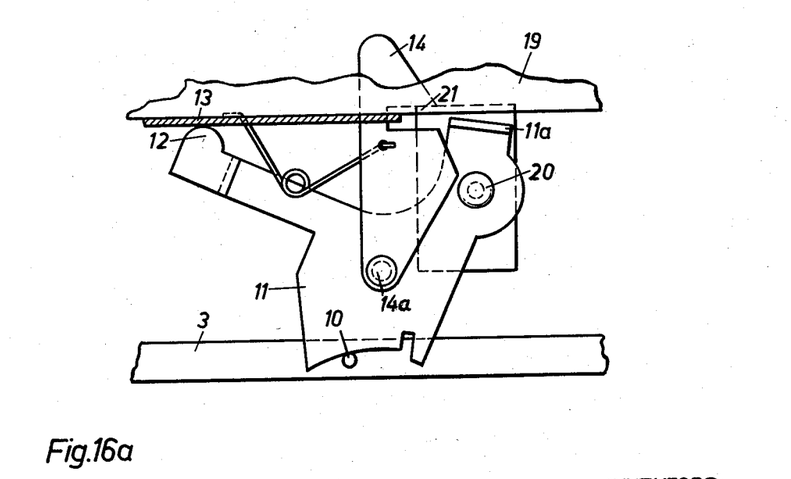
Fig. 16a is a fragmentary view similar to that shown in Fig. 16, yet disclosing the operative position.

The above-mentioned features of the present invention, modifying the dispenser previously described, will be more fully understood from the embodiment illustrated in Figs. 13 to 15, where all reference numerals below 100 denote parts similar to those denoted by the same respective reference numerals in Figs. 1 through 11, whereas the parts denoted by reference numerals above 100 relate to modified or additional components.

For saving space, the air-brake cylinder 40 is removed from the interior of the dispenser housing G and is placed upon the outer side of the rear wall. For similar reasons, the spring 7 is disposed within the brake cylinder 40. An auxiliary control rod 101 is provided between pusher rod 3 and control rod 32 and extends parallel to both. The brake cylinder 40 and the power storing spring 7, in contrast to the first-described embodiment, are not connected with the pusher rod 3 but with the auxiliary control rod 101. Another power storing spring 102 of preadjusted tension, is disposed between the pusher rod 3 and the auxiliary control rod 101. The inward end of the auxiliary control rod 101 is guided in a bearing angle 103 in coaxial engagement with the pusher rod 3. The bearing angle 103 also serves for fastening the power storing spring 102.

By virtue of this design, the pusher rod 3, when moving forward, elastically entrains the auxiliary control rod 101. The travel of control rod 101 is regulated by the brake cylinder 40 so that a too-rapid movement of the pusher rod 3 has only the effect of additionally tensioning the power storer 7 but cannot affect the operation of the conveying devices because the guide pins 10 and 22 which actuate these conveying devices are no longer mounted on the pusher rod 3 but on the auxiliary control rod 101. As a result, there is always practically the same period of time available for the cigarette to pass from the magazine into the holder claw 4 within guiding trough 28, irrespective of the speed at which the pusher rod 3 is actuated.

To prevent the operation of the conveying means from becoming faulty by incomplete and repeated pushing of the pusher rod 3, the latter is provided with another latching device which prevents a return movement of the pusher rod 3 as long as the rod is not completely moved to its inward limit position. The latching device comprises a pawl 104 pivotally mounted on the rear bearing angle 45. Pawl 104 enters into a saw-tooth rack portion 105 near the inward end of the pusher rod 3. Fig. 15 shows the just-mentioned parts more clearly seen from above. When the pusher rod 3 is forced toward the left, the pawl 104 is disengaged from the releasing plate 39 and drops into the saw teeth 105 of the pusher rod 3. If the pusher rod 3, prior to being latched in the left-hand limit position, is not further actuated, then it cannot run back to the starting position due to the pawl 104 which engages the saw teeth 105, and the rod 3 will remain in the position then reached. If at that moment the auxiliary control rod 101 has commenced operating the conveying devices of the dispenser, these devices likewise remain arrested in the positions reached. Only when the pusher rod 3 is further forced forward to its left-hand limit position and is latched, will the normal operation of the conveying devices commence or continue. Then, the control rod 32 is put in motion with the effect of closing the electric circuit of the lighter spiral and controlling the return movements of the conveying devices. At the beginning of the traveling motion of control rod 32, the release plate 39 glides along the inclined edge 104a of pawl 104 and pushes it out of the rack teeth 105.

As mentioned, a grating with parallel slots may be inserted at the top opening of the magazine chamber which permits the insertion of cigarettes only in mutually parallel positions, thus preventing the cigarettes in the magazine from edging or occupying slanting positions relative to the conveying devices.

It will be obvious to those skilled in the art, upon a study of this disclosure, that the present invention permits of various modifications and hence may be embodied in devices other than those particularly illustrated and described herein, without departing from the essential features of our invention and from the scope of the claims annexed hereto.

While we have, therefore, disclosed several embodiments of the present invention, it is to be understood that these embodiments are given by example only and not in a limiting sense, the scope of the present invention being determined by the objects and the claims.

We claim:

1. A cigarette dispenser, comprising a housing having a dispensing opening and an electric lighting device coaxially spaced from said opening, a cigarette magazine in said housing, said magazine having two bottom plates forming together an elongated gap through which an individual cigarette may pass, conveying mechanisms having slider means and cigarette-holding claw means, said slider means being displaceable in a direction transverse to said gap for shifting said cigarette into said claw means, a trough structure extending beneath said claw means from said lighting device to said dispensing opening, said claw means being displaceable in and along said trough structure for longitudinally displacing said cigarette into lighting contact with said device and thereafter in the reverse direction and partly out of said dispensing opening, a pusher rod having a starting position and being manually controllable to move longitudinally forward from said position, said slider means and claw means having respective starting positions and being coupled with said pusher rod and entrainable thereby only during forward run of said rod, a control rod extending parallel to said pusher rod, and a plurality of mutually separate spring members connected with said respective slider means and claw means and so as to be tensioned by said forward run of said pusher rod for individually returning said rod and said respective two means to said respective starting positions, and releasing means for disengaging said control rod from said pusher rod at the end of said forward run whereby said control rod is returned by one of said spring members.

2. The dispenser, as set forth in claim 1, which includes an angular coupling lever having a fixed pivot axis, said pusher rod having a transverse coupling pin engaging said lever for pivotally displacing said lever, and said lever being linked to said slide means for coupling it with said rod.

3. The dispenser, as set forth in claim 1, which includes a closure plate located beneath said bottom plates and inclined downwardly toward said claw means, said closure plate being movable from a gap-opening position remote from said claw means to a gap-closing position adjacent to said claw means so as to guide said cigarette into said claw means and said trough structure, said closure plate being linked to said slider means to be actuated thereby.

4. The dispenser, as set forth in claim 1, wherein said two bottom plates are pivotally reciprocable in mutually opposed directions and being linked to said slider means to be actuated thereby, said bottom plates having respective pivot axes remote from said gap and parallel thereto whereby the gap is changed during reciprocation of said bottom plates, and a closure plate beneath said bottom plates and movable between gap-opening and gap-closing positions, said closure plate being normally in gap-opening position and being linked to said slider means to move to gap-closing position when said bottom plates are being reciprocated by said slider means.

5. The dispenser, as set forth in claim 1, which icludes a coupling lever having a fixed pivot axis and an elongated hole, a guide pin mounted on said pusher rod and engaging said hole for angularly displacing said lever from a starting position to a limit position and back during forward and return run respectively of said pusher rod, said coupling lever being linked to said claw means for coupling the latter with said rod.

6. A cigarette dispenser, comprising a magazine chamber, an electric lighting device, conveying mechanisms having means for discharging an individual cigarette from said magazine chamber and means for shifting said cigarette longitudinally into lighting contact with said device and then in the reverse direction and partly out of the dispenser, a pusher rod having a normal position of rest and being manually controlable to move longitudinally forward from said position, said mechanism means having respective starting positions and being entrained by said pusher rod only during the forward run of said rod, a control rod extending parallel to said pusher rod and entrainable thereby only during the forward run of said pushing rod, a plurality of individual spring members connected with said respective mechanism means and rods to be tensioned by said forward run of said pusher rod for individually returning said mechanism means, releasing means for disengaging said control rod from said pusher rod at the end of said forward run whereby said control rod is returned by one of said springs, electric switch means actuable by said control rod and electrically connected with said lighting device to effect lighting of said cigarette when said pusher rod is still located at said end of said forward run.

7. The dispenser, as set forth in claim 6, including brake means connected with said control rod for retarding its return movement responsive to a predetermined cigarette-lighting period.

8. A cigarette dispenser, comprising a magazine chamber, an electric lighting device, conveying mechanisms having means for discharging an individual cigarette from said magazine chamber and means for shifting said cigarette into lighting contact with said device and then reversely and partly out of the dispenser, a pusher rod having a normal position of rest and being manually displaceable in its longitudinal direction to a limit position, latch means engageable with said pusher rod for arresting it in said limit position during the cigarette-lighting interval, said mechanism means having respective starting positions and being coupled with said pusher rod to be entrained thereby only during forward run of said pusher rod, a control rod extending parallel to said pusher rod and entrainable thereby only during said forward run, a plurality of return springs connected with said respective mechanism means and rods to be tensioned by said forward run of said pusher rod for individually returning said mechanism means and rods, releasing means for disengaging said control rod from said pusher rod when said pusher rod reaches said limit position whereby said control rod is returned by one of said springs, electric switch means actuable by said control rod and connected with said device to effect lighting of said cigarette, said control rod having a release member engageable with said latch means when said control rod is in returned position for disengaging said latch means from said pusher rod so that said pusher rod also returns to its starting position.

9. A cigarette dispenser, comprising a housing having a dispensing opening at the front, an electric lighting device disposed at the rear of said housing and opposite said opening, a magazine chamber in said housing, said magazine chamber having two bottom plates forming together an elongated gap through which an individual cigarette may pass, conveying mechanisms having slider means and cigarette-holding claw means, said slider means being displaceable in a direction transverse to said gap for shifting said cigarette into said claw means, said claw means being displaceable for moving said cigarette longitudinally into lighting contact with said device and thereafter in the reverse direction and partly out of said dispensing opening, a pusher rod having a starting position and being manually controllable to move longitudinally forward from said position, said slider means and claw means having respective starting positions and being coupled with said pusher rod and entrainable thereby only during forward run of said rod, a control rod extending parallel to said pusher rod, spring means connected with said respective slider means and claw means so as to be tensioned by said forward run of said pusher rod for returning said rod and said respective slider and claw means to said starting position, a latching device locking said pusher rod in its starting position, said claw means having a resiliently movable claw member connected with said latching device to release said pusher rod for a forward run only when said cigarette is taken out of said claw means, and releasing means for disengaging said control rod from said pusher rod at the end of said forward run whereby said control rod is returned by one of said spring members.

10. The dispenser, as set forth in claim 6, including a housing which encloses said magazine chamber and conveying mechanisms, a chimney mounted on the rear side of said housing and having a lateral opening, said lighting device being mounted in said opening, and a leaf spring engaging said device and forcing it partly through said opening.

11. A cigarette dispenser, comprising a magazine chamber, an electric lighting device, conveying mechanism having means for discharging an individual cigarette from said magazine chamber and means for shifting said cigarette longitudinally into lighting contact with said device and then in the reverse direction and partly out of the dispenser, a pusher rod having a normal position of rest and being manually controllable to move longitudinally forward from said position, power source means controlled by said rod and connected with said mechanisms for actuating said means, a control rod extending parallel to said pusher rod, a plurality of individual spring members connected with said respective mechanism means and rods to be tensioned by the forward run of said pusher rod for individual returning said mechanism means, and releasing means for disengaging said control rod from said pusher rod at the end of said forward run whereby said control rod is returned by one of said spring members, a housing which encloses said magazine and conveying mechanisms, a chimney mounted on the rear side of said housing, said chimney having curved shape and extending along the top of said housing to the front side thereof so as to have the chimney outlet located at the dispenser front, said lighting device being mounted on said chimney at the rear of said housing.

12. The dispenser, as set forth in claim 11, including an additional electric heating surface located in said chimney above and adjacent to said lighting device for heating the smoke and burning the carbon oxide contained therein.

13. The dispenser, as set forth in claim 6, including an auxiliary control rod parallel to said pusher rod, a pretensioned spring member connecting said auxiliary control rod with said pusher rod so as to entrain said auxiliary control rod through said spring member during the forward run of said pusher rod, said auxiliary control rod forming a resilient coupling between said pusher rod and said mechanism means for indirectly entraining the latter.

14. The dispenser, as set forth in claim 6, which includes an auxiliary control rod parallel to said pusher rod, a pretensioned spring member connecting said auxiliary control rod with said pusher rod so as to resiliently entrain said auxiliary control rod through said spring member during the forward run of said pusher rod, brake means connected with said auxiliary control rod for controlling its speed whereby said speed is independent of the travel speed of said pusher rod, said auxiliary rod forming a coupling between said pusher rod and said mechanism means for indirectly entraining the latter at a speed determined by that of said auxiliary rod.

15. The dispenser, as set forth in claim 6, which includes arresting means engageable with said pusher for preventing its return movement, and releasing means adapted to release said arresting means when said pusher rod reaches said limit position, whereby repeated operation of said pusher rod after an incomplete forward run is prevented.

16. The dispenser, as set forth in claim 6, wherein said pusher rod has a longitudinal row of rack teeth, and includes a pawl engageable with said rack teeth for preventing return travel of said pusher rod, and release means engageable with said pawl for releasing it in said limit position of said pusher rod, whereby repeated operation of said pusher rod after an incomplete forward run is prevented.

17. The dispenser, as set forth in claim 6, which comprises a grating having parallel slots and being mounted across the top opening of said magazine chamber to secure parallelism of the cigarettes filled into said magazine chamber.

References Cited in the file of this patent

UNITED STATES PATENTS

| Number | Name | Date |
|---|---|---|
| 2,216,675 | Prescott et al. | Oct. 1, 1940 |
| 2,277,451 | Paseka | Mar. 24, 1942 |
| 2,545,936 | Zanardo | Mar. 20, 1951 |
| 2,552,481 | Eberhardt et al. | May 8, 1951 |

FOREIGN PATENTS

| Number | Country | Date |
|---|---|---|
| 1,106,880 | France | July 27, 1955 |